United States Patent
Panichkul et al.

(10) Patent No.: US 6,775,537 B1
(45) Date of Patent: Aug. 10, 2004

(54) APPARATUS, AND ASSOCIATED METHOD, FOR FACILITATING NET-SEARCHING OPERATIONS PERFORMED BY WAY OF A MOBILE STATION

(75) Inventors: Mateera Panichkul, San Diego, CA (US); Anders Fahnøe Heie, San Diego, CA (US); Dandi Lynde-Redman, San Diego, CA (US)

(73) Assignee: Nokia Corporation, Espoo (FI)

( * ) Notice: Subject to any disclaimer, the term of this patent is extended or adjusted under 35 U.S.C. 154(b) by 0 days.

(21) Appl. No.: 09/499,086

(22) Filed: Feb. 4, 2000

(51) Int. Cl.[7] .............................................. H04M 1/00
(52) U.S. Cl. ........................ 455/414.1; 455/412.1; 455/550.1
(58) Field of Search ................................. 455/414, 566, 455/412, 550, 556, 557, 558, 575, 90, 414.1, 414.3, 412.1, 550.1, 575.1; 707/3, 4, 5, 10, 102

(56) References Cited

U.S. PATENT DOCUMENTS 6,173,284 B1 * 1/2001 Brown ......................... 707/10
6,195,661 B1 * 2/2001 Filepp et al. ................ 707/102
6,484,162 B1 * 11/2002 Edlund et al. .................. 707/3

* cited by examiner

Primary Examiner—Sonny Trinh

(57) ABSTRACT

Apparatus, and an associated method, for a mobile station operable in a radio communication system. Improved convenience of use of the mobile station in the performance of net-searching operations is provided. A search query entered at the mobile station is selectably stored at a memory located at the mobile station. If the same search query is to be reused for a subsequent search, a search query is retrieved from the memory and reused, thereby obviating the need of the user of the mobile station to reenter the entire search query.

16 Claims, 3 Drawing Sheets

APPARATUS, AND ASSOCIATED METHOD, FOR FACILITATING NET-SEARCHING OPERATIONS PERFORMED BY WAY OF A MOBILE STATION

The present invention relates generally the performance of net-searching operations through the use of a mobile station operable in a radio communication system, such as a cellular communication system. More particularly, the present invention relates to a user interface, and an associated method, by which to facilitate initiation of the net-searching operations at a mobile station. Search patterns, entered by a user of the mobile station, are selectably stored at the mobile station. If the same net-searching operation is subsequently to be performed, the search pattern is retrieved and reused. Thereby, the user of the mobile station does not need to re-enter the same search pattern to repeat the net-searching operation.

BACKGROUND OF THE INVENTION

A communication system is formed, at a minimum, of a transmitting station and a receiving station interconnected by a communication channel. Communication signals generated by the transmitting station are transmitted upon the communication channel, thereafter to be received by the receiving station.

A radio communication system is a communication system in which at least a portion of the communication channel is formed of a portion of the electromagnetic spectrum. Increased mobility of communications is permitted, as a fixed or hard-wired connection is not required to be formed between the transmitting and receiving stations.

A cellular communication system is an exemplary radio communication system. A subscriber to a cellular communication system, when positioned at a location within an area encompassed by network infrastructure of the cellular communication system, is able to communicate by way of the system through the use of a mobile station. A mobile station includes radio transceiver circuitry capable of transceiving radio signals communicated upon radio channels formed between the mobile station and the network infrastructure of the communication system.

The network infrastructure of a cellular communication system includes spaced-apart, fixed-site base stations which also include radio transceivers capable of transceiving the communication signal with the mobile stations operable in the system. Each fixed-site base station defines a cell, and as a mobile station used by a subscriber travels between cells defined by successive ones of the base stations, uninterrupted communication by way of the mobile station is possible by handing-over communications from one base station to another. Because of the positioning of the base stations, only relatively low-power signals are required to be generated to effectuate communications between a mobile station and a base station. And, the same channel frequencies are reusable at spaced-apart locations throughout the area encompassed by the cellular communication system, thereby to relatively efficiently utilize the bandwidth allocated to a cellular communication system.

In spite of the relatively efficient utilization of the bandwidth allocated to a cellular communication system, the allocated bandwidth is sometimes a limiting factor in the communication capacity of a cellular communication system. To increase the communication capacity of the communication system, the allocated bandwidth must be more efficiently utilized.

Utilization of digital communication techniques provides a manner by which to more efficiently utilize the bandwidth allocated to the communication system. Through the use of digital techniques, for instance, the same frequency band can define two, or more, channels, thereby doubling, or more, the communication capacity of the frequency band.

The use of digital communication technique has permitted the introduction of communication services involving the communication of non-voice data by such cellular, and other radio, communication systems.

Non-voice data is communicated, e.g., during the performance of information retrieval services, of which net-searching operations are exemplary. In a net-searching operation, a searcher forms a search pattern and provides the search pattern to a search engine, sometimes referred to as a web browser. In conventional wireline systems, the searcher typically enters a search pattern at a computing station, such as a personal computer. The computing station is connected, typically by way of the Internet, to a remote server at which a web-browser search engine is resident. The search engine performs a search and returns search results, also typically by way of the Internet, to the computing station at which the search pattern originated. The search results are then displayed at the computing station.

With increases in the computing capacities of mobile stations as well as their capacity to communicate utilizing digital communication techniques, some mobile stations are capable of network-type communications, such as by way of the Internet. That is to say, communication signals formatted to permit their communication by way of Internet connections are able to be communicated by the mobile stations, transmitted upon a radio link to network infrastructure of the cellular communication system and thereafter by way of Internet connections to another location.

For instance, a user of such a mobile station is able to enter search patterns at the mobile station to initiate performance of a net-search operation. The search pattern is entered, typically, by utilizing a keyboard which forms a portion of the mobile station. Unlike conventional computing stations, such as personal computers, which typically utilize a conventionally-sized entry keyboard, mobile stations typically utilize much smaller-sized keyboards to maintain the portability of such mobile stations. Because of the smaller size of the keyboard generally utilized at a mobile station, keystroke entry of data, such as the search pattern, by a user is not as easily effectuated as with conventionally-sized keyboards.

A user entering a search pattern might enter the same search pattern on different occasions. That is to say, the user of the mobile station might enter a search pattern a first time and, subsequently, wish to have the same search performed at a later time. Subsequent performance of the same search conventionally necessitates re-entry of the same search pattern. While at a conventionally-sized keyboard, such re-entry of the search pattern does not require significant effort. When such entry is necessitated at a smaller-sized keyboard of a mobile station, the inconvenience of such re-entry is somewhat greater.

If a manner could be provided by which to reduce the effort required to re-enter a search pattern, improved convenience of operation of a mobile station, or the like would result.

It is in light of this background information related to mobile stations that the significant improvements of the present invention have evolved.

SUMMARY OF THE INVENTION

The present invention, accordingly, advantageously provides a user interface, and an associated method, for a mobile station operable in a radio communication system, such as a cellular communication system.

Through operation of an embodiment of the present invention, improved convenience of use of the mobile station by a user to enter search patterns to effectuate a net-searching operation is facilitated, thereby increasing the ease of use of the mobile station pursuant to such a communication service.

In one aspect of the present invention, search patterns, entered by a user of the mobile station pursuant to a net-searching operation, are selectably stored at the mobile station. If the same net-searching operation is subsequently to be performed, the search pattern, previously stored, is retrieved. Once retrieved, the search pattern is reused pursuant to the subsequent net-searching operation. Because of the retrieval of the previously-stored search pattern, the user of the mobile station need not re-enter the entire search pattern. Ease of use of the mobile station, typically including a small-sized entry keyboard, is thereby facilitated.

In one implementation, the mobile station includes a storage element for storing a plurality of search patterns, entered by a user of the mobile station. The user elects to store the search pattern subsequent to its entry by the user by way of the keyboard of the mobile station. Selection is made by the user, for example, by appropriate actuation of an actuation of the keyboard of the mobile station. When detection of the appropriate keyboard entry is made, the entered search pattern is stored at a storage element. Selection to store the entered search pattern is made at any time subsequent to its entry by the user. That is to say, the user is able to select storage of the entered search pattern prior to transmission of the search pattern to a web browser search engine, or subsequent to receipt from the web browser search engine of the results of the net-searching operation. The user is thereby able to elect selection of the storage of the search pattern subsequent to a determination by the user that the search pattern produces desired results.

In another implementation, the storage element is capable of storing a plurality of search patterns, each search pattern selected for storage by the user of the mobile station or otherwise resident in the storage element. Indicia of each of the search patterns stored at the storage element is displayable upon a user display of the mobile station. The display of the indicia upon the user display is generated responsive, for instance, to appropriate user actuation of the actuation keyboard of the mobile station to request such a display. The user thereafter selects, from the display of indicia of the search patterns stored at the storage element, retrieval of a selected one of the search patterns. Effectuation of the selection is also made, for instance, by appropriate actuation of an actuation key of the keyboard of the mobile station. Upon selection of retrieval of the selected search pattern, the search pattern is retrieved from the storage element. The search pattern is then transmitted by the mobile station, over a radio link formed with network infrastructure of the radio communication system in which the mobile station is operable, and then routed to a web browser server at which a web browser search engine is located. The net-searching operation is performed, and the results are returned to the mobile station to be displayed on the user display thereof. Retrieval of the search pattern, earlier-stored at the storage element of the mobile station, obviates the need of the user to input, by way of a small-sized keyboard of the mobile station, the string of characters of which the search pattern is formed. Improved convenience of operation of the mobile station at which to initiate performance of net-searching operations is thereby provided.

In an exemplary implementation, the mobile station is operable in a cellular communication system, such as a cellular communication system operable pursuant to a CDMA (Code-Division, Multiple-Access) or TDMA (Time-Division, Multiple Access) communication scheme. A user interface is provided for the mobile station and includes an actuation keyboard actuable by a user to input alphanumeric characters which, when entered, form a data sequence defining a search pattern. The search patterns are selectably stored at a storage element to be later retrieved from the storage element. The user interface further includes a user display for displaying the characters entered by the user pursuant to actuation of selected keys of the actuation keyboard. The user display is further operable to display search results provided to the mobile station pursuant to net-searching operations performed responsive to the search patterns generated at the mobile station, and sent elsewhere. Indicia of the search patterns selectably stored at the storage element are also displayable upon the user display. Responsive to display of the indicia, a user is able to cause retrieval of a search pattern stored at the storage element, again, through appropriate actuation of an actuation key of the keyboard actuator. The retrieved search pattern is reusable to initiate performance of a net-searching operation defined by the search pattern without necessitating the user to again enter the characters of the data sequence forming the search pattern.

In these and other aspects, therefore, user interface apparatus, and an associated method, is provided for a mobile station operable in a radio communication system. The mobile station is operable at least to generate search patterns pursuant to net-searching operations. Each search pattern is formed of a data sequence. The user interface apparatus facilitates the net-searching operations initiated by a user of the mobile station. A storage element is selectably operable to store at least a first search pattern entered by the user pursuant to a first net-searching operation. A retriever is coupled to the storage to receive a request by the user to retrieve a selected search pattern of the at least the first search pattern. The retriever retrieves the selected search pattern from the storage element responsive to the request therefor. The selected search pattern, once retrieved, is usable pursuant to a subsequent net-searching operation.

A more complete appreciation of the present invention and the scope thereof can be obtained from the accompanying drawings, which are briefly summarized below, the following detailed description of the presentlty-preferred embodiments of the invention, and the appended claims.

DETAILED DESCRIPTION OF THE PREFERRED EMBODIMENT

Figure 1:
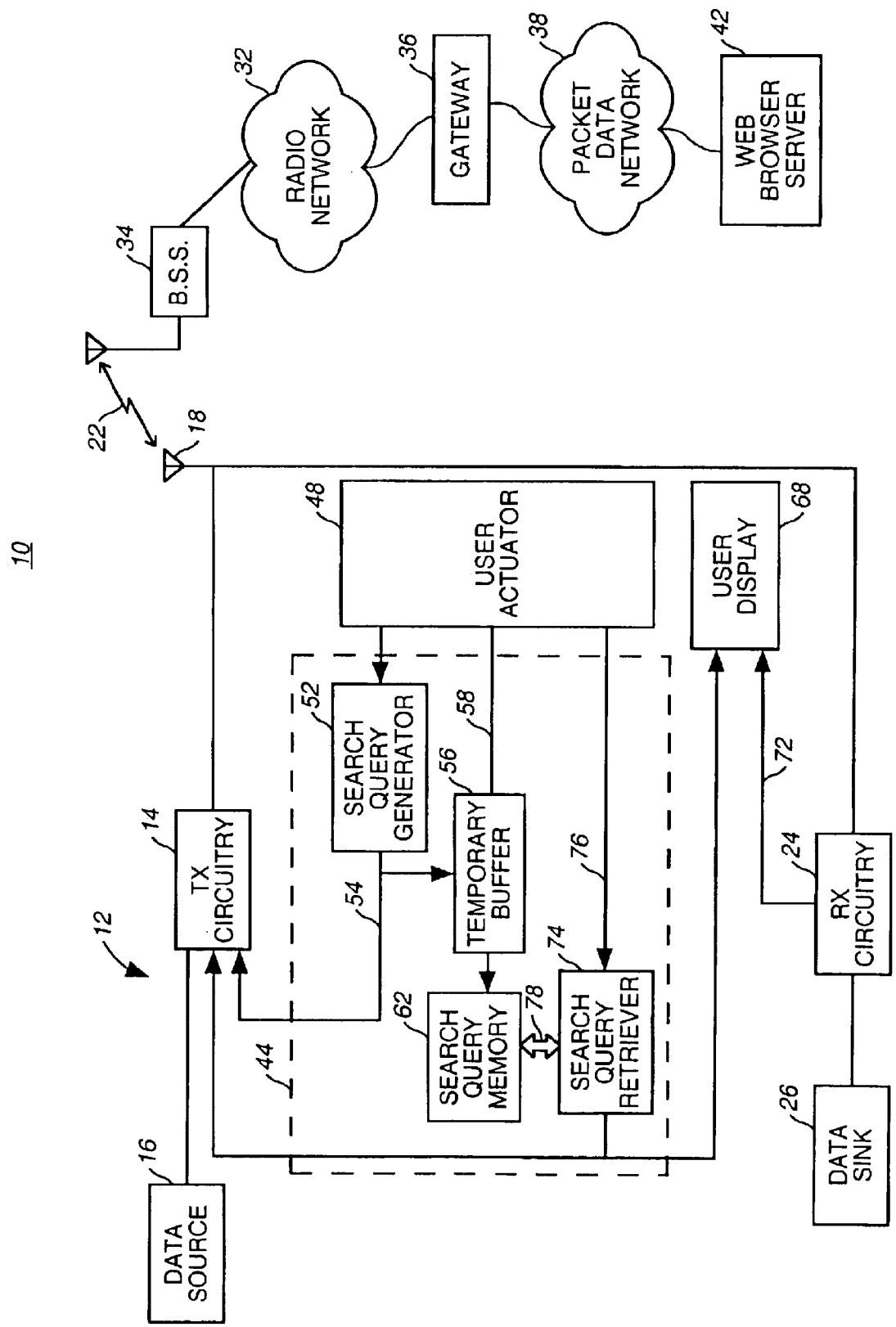
FIG. 1 illustrates a functional block diagram of a radio communication system in which an embodiment of the present invention is operable.

Referring first to FIG. 1, a radio communication system, shown generally at 10, is operable to provide for radio communications with a mobile station 12. In the exemplary implementation, the radio part of the communication system 10 forms a cellular communication system, such as a cellular communication system operable pursuant to a CDMA (Code-Division, Multiple-Access) or TDMA (Time-Division, Multiple Access) communication scheme. In other implementations, the radio part of the communication system is formed of other types of radio communication systems, and the mobile station 12, correspondingly, is operable in such other radio communication systems. Therefore, while the following description of exemplary operation of the present invention shall be described with respect to a cellular communication system, an embodiment of the present invention is similarly also operable in other types of radio communication systems.

The mobile station includes a transmit portion including transmit circuitry 14 to which data sourced at a data source 16 is provided. The transmit circuitry is operable, in conventional manner, to convert data provided thereto to radio frequency levels. The transmit circuitry, for instance, includes modulation and up-conversion elements to generate a modulated signal of radio frequencies. Signals generated by the transmit circuitry 14 are transduced by an antenna transducer 18 into electromagnetic form, thereafter to be communicated upon the radio link 22.

The mobile station is also shown to include a receive portion including receive circuitry 24, also coupled to the antenna transducer 18. Communication signals communicated by way of the radio link 22 to the mobile station 12 are converted into electrical form at the transducer 18 and provided to the receive circuitry 24. A data sink 26 is coupled to the receive circuitry 24 to form the destination to which certain of the data recovered during operation of the receive circuitry is provided. Through operation of the transmit and receive circuitry 14 and 24, two-way communication is permitted by way of the radio link 22.

In the exemplary implementation, the mobile station is operable to communicate both voice and nonvoice data. The mobile station is here operable to generate, and receive, data formatted for communication upon a packet data network, such as the Internet. Communication services provided to, or initiated at, a conventional work station, such as a personal computer, connected by way of a conventional wireline connection to the Internet are also performable by the mobile station by way of the radio link 22 rather than solely by way of a wireline connection. Net-searching operations, such as web browsing requests, are thereby performable through the use of the mobile station 12.

The communication system 10 is here shown further to include a network portion with which the mobile station 12 communicates. The network portion includes both the radio part and a packet data part. The radio part of the network portion includes a radio network 32 to which a base station system (BSS) 34 is coupled to form a portion. The radio network 32 is coupled by way of a gateway 36 to a packet data network 38, such as the Internet backbone. A web browser server 42 is here shown to be coupled to the packet data network. Communication paths are formed during operation of the communication system 10 between the mobile station 12 and the web browser server 42 by way of the radio link 22 and through the network portion including the base station system 34, radio network 32, gateway 36, and packet data Search requests, formed of search patterns, generated at the mobile station 12, are communicated upon communication paths formed between the mobile station and the web browser server to initiate net-searching operations. In conventional manner, when the search pattern is received at the web browser server, a search engine resident thereat performs a web-based search, in conventional fashion. Results of the net-searching operation are returned by way of the communication path to the mobile station. Thereby, the results of the net-searching operation are provided to the mobile station.

The mobile station 12 includes a user interface 44 through which a user of the mobile station operates the mobile station. In addition, to effectuate operation of other functions of the mobile station, the user of the mobile station utilizes the user interface to initiate, and to review the results of, net-searching operations.

The user interface 44 includes a user actuator 48 formed of an actuation keyboard. As noted previously, to facilitate the portability of the mobile station, the actuation keyboard is generally of relatively small dimensions. While the small size of the actuation keyboard facilitates the portability of the mobile station, such small size makes entry of data through actuation of the actuation keys of the actuation keyboard somewhat more difficult. Through operation of an embodiment of the present invention, increased ease of use of the mobile station to perform net-search operations is provided by permitting the storage of entered search patterns at the mobile station. Once stored, the search pattern is retrievable and thereafter reusable. If a user of the mobile station desires to initiate a net-searching operation utilizing a search pattern similar, or identical, to a search pattern previously utilized, and stored, reduced need to enter additional information through additional actuation of the actuation keypad results.

The user interface 44 also includes, therefore, additional elements to permit operation of an embodiment of the present invention. The user interface also includes a search query generator 52 coupled to the user actuator 48. The generator 52 is operable responsive to actuation of the actuation keys of the user actuator by the user of the mobile station to form search patterns therefrom. Search patterns formed by the search query generator 52 are provided to the transmit circuitry 14, here by way of the line 54.

The entered search query is also stored at a temporary buffer 56 which, for purposes of illustration, is shown to be functionally separate from the search query generator 52. In an actual implementation, the generator 52 and the buffer 56 may form a single element. The temporary buffer 56 is here shown further to be coupled to the user actuator 48 by way of the line 58. Selected actuation of the user actuator causes a signal generated on the line 58 to cause the search query, stored at the temporary buffer, to be stored at a search query memory 62 to which the temporary buffer 56 is coupled by way of the line 64. Thereby, a search query entered through actuation of the actuation keypad by the user and stored at the temporary buffer 56 is subsequently storable at the search query memory 62 through appropriate additional actuation of the actuation keyboard. In the exemplary implementation, the search query memory 62 is a read/write memory capable of storing a plurality of search queries thereat. In another implementation, the search query memory is located at the network portion of the communication system. Operation of such an implementation differs with that shown in the figure in that selection by the user to store a search query is communicated to the network portion.

When the search query is provided to the transmit circuitry 14, the query is converted into a form to permit its communication to the web browser server 42 whereat a net-searching operation is performed and the search results are returned to the mobile station. Here, a signal containing the results of the net-searching operation is communicated through the network portion of the communication system, over the radio link 22, and converted into electrical form by the antenna transducer 18. The signal containing the results is provided to the receive circuitry 24. A user display 68 is coupled to the receive circuitry by way of the line 72, and the results of the net-searching operation are caused by the receive circuitry to be displayed upon the user display 68. In the exemplary implementation, the user display forms a LCD (Liquid Crystal Display), or the like. Thereby, the user of the mobile station is provided with the results of the net-searching operation.

By displaying the results of the net-searching operation, the user of the mobile station is provided with an indication of the success of the search query, previously entered. If the results are determined to be successful, the user is able still to actuate the appropriate actuation keys of the actuation keyboard to cause the search query stored at the temporary buffer 56 to be stored at the search query memory 62. Thereby, a decision to store the search query in the search query memory is deferred until the results of the net-searching operation are obtained and displayed at the user display.

The user interface 44 also includes a search query retriever 74, coupled to the user actuator 48 by way of the line 76. The search query retriever is further coupled to the search query memory 62 by way of the lines 78. The search query retriever is operable responsive to appropriate actuation of an actuation key of the actuation keyboard 48 to retrieve search queries stored at the search query memory 62. Indicia of search queries stored at the search query 62 are also displayable upon the user display 68, here provided thereto by way of the line 82, to indicate to the user the search query stored at the search query memory. The line 82 is also coupled to the transmit circuitry 42 to provide search queries retrieved by the retriever to the transmit circuitry, thereafter to be communicated to the web browser server 42 whereat the net-searching operation is subsequently performed.

Because the subsequent search is initiated by retrieving a search query, previously entered and stored at the search query memory 62, reentry of the search query need not be again performed by way of actuation of the actuation keys of the user actuator 48. Thereby, the sequence of alphanumeric data forming the search query need not be reentered in its entirety. Instead, actuation of the actuation keys of the user actuator 48 is required merely to retrieve the previously-stored search query, to be reused for the subsequent net-searching operation. In one implementation, once the search query is retrieved from the search query memory, amendment, or other alteration of the retrieved search query can be made through appropriate actuation of the actuation keys of the user actuator by the user. Thereby, the previously-entered search query can be amended without requiring complete reentry of the entire search query.

Figure 2:
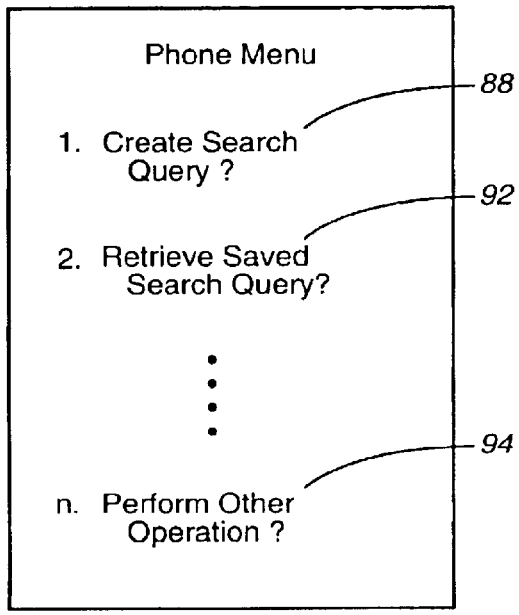
FIG. 2 illustrates an exemplary screen display generated during operation of the user interface forming a portion of the mobile station shown in FIG. 1.

FIG. 2 illustrates an exemplary display, shown generally at 86, displayed upon the user display of the mobile station shown in FIG. 1. The display 86 represents a display displayable upon the user display prior to initiation of net-searching operations. Here, a selection menu permits a user of the mobile station to initiate any of various mobile station operations. A user is prompted to select one of several options, including an option 88, selection of which permits creation of a new search query to be entered through the user actuator 48 of the mobile station. A menu selection 92 permits initiation of retrieval operations to retrieve a previously-stored search query. Additional mobile station operations are performable responsive to selection of appropriate menu entry of the selection menu 86. Here, the menu selection 94 is representative of such other selectable mobile station operations.

Figure 3:
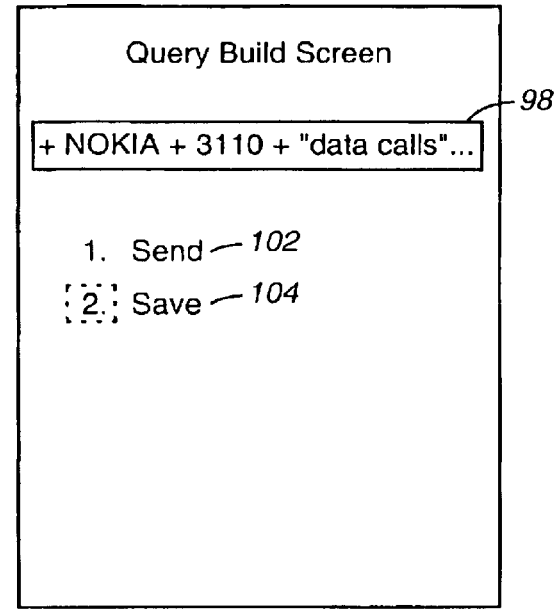
FIG. 3 illustrates another exemplary screen display generated during operation of the user interface forming a portion of the mobile station shown in FIG. 1.

FIG. 3 illustrates a display, shown generally at 96, generated upon the user display 68 of the mobile station 12, shown in FIG. 1, responsive to selection of the menu selection 88 of the screen display 86 shown in FIG. 2. Here, the display 96 includes a window 98 at which a search query, as the query is entered by the user, is displayed. And, the display includes the menu selections 102 and 104, selectable by the user to cause the entered search query to be sent and to be stored at the search query memory 62.

Figure 4:
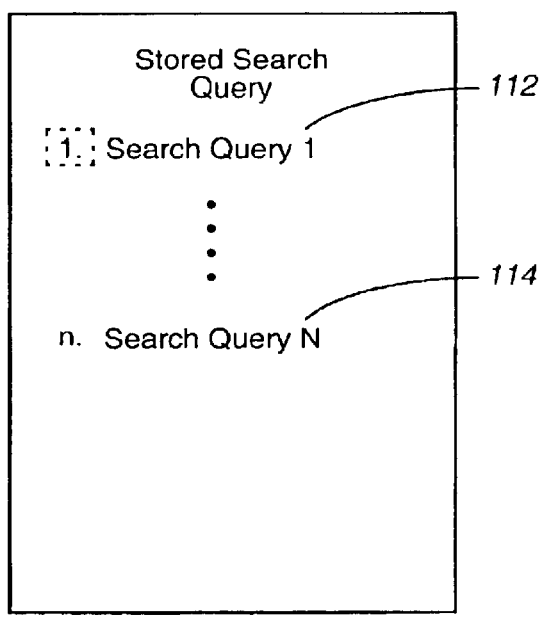
FIG. 4 illustrates another exemplary screen display generated during operation of the user interface which forms a portion of the mobile station shown in FIG. 1.

FIG. 4 illustrates another screen display, shown generally 108, displayable upon the user display 68. The screen display 108 is representative of the screen which is displayed subsequent to selection by the user of the menu option 92 of the screen display 86 shown in FIG. 2. That is, the screen display 108 is displayed when the user of the mobile station desires to retrieve a previously-stored search query. Here, the screen display includes indicia 112 of the different search queries stored at the search query memory. Upon selection of a particular search query, indicated by the indicia 112, the search query is retrieved, thereafter to be reused pursuant to a subsequent net-searching operation.

Figure 5:
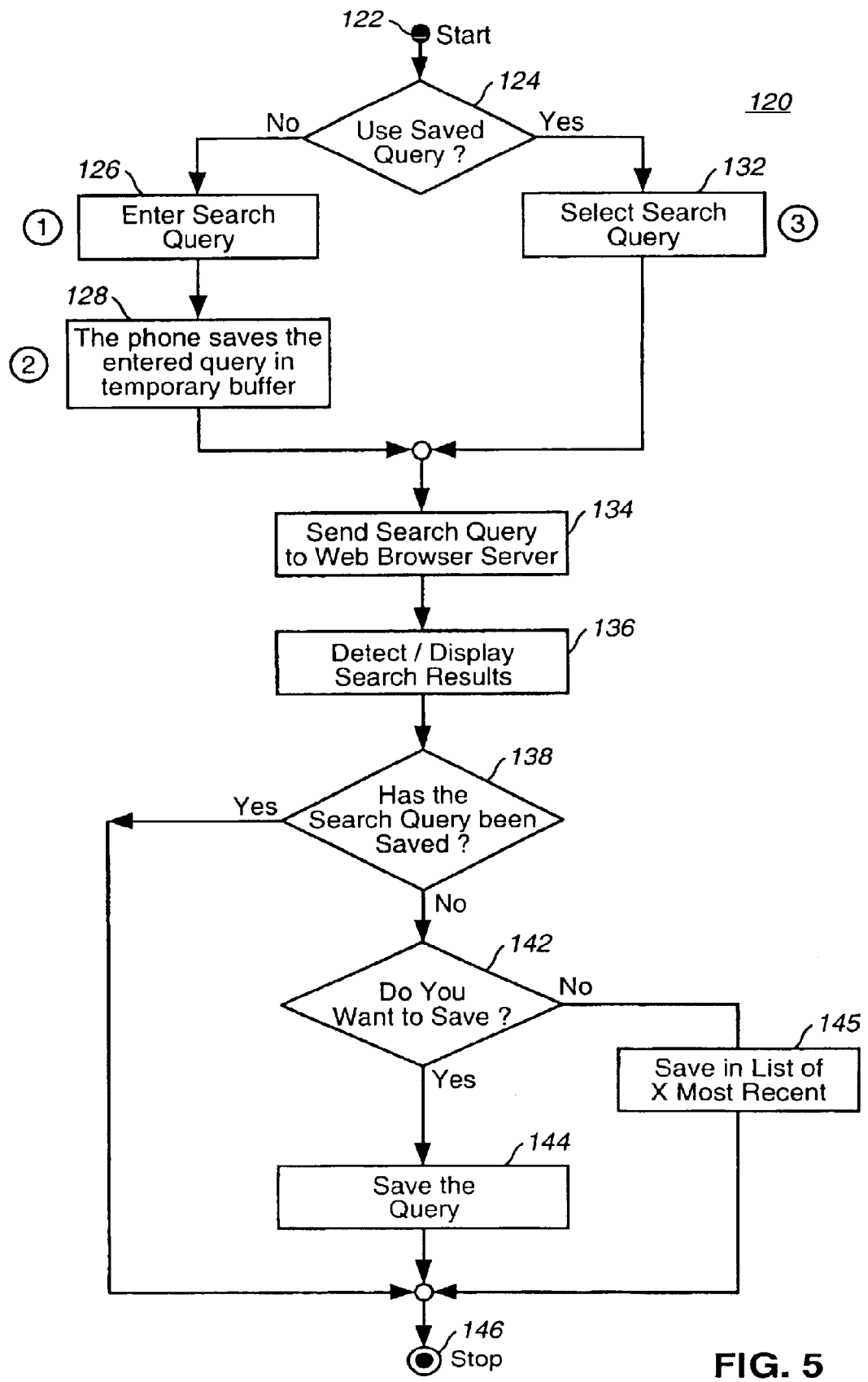
FIG. 5 illustrates a method flow diagram representative of the method of operation of an embodiment of the present invention.

FIG. 5 illustrates a method, shown generally at 120, of the method of operation of an embodiment of the present invention. After entry, indicated by the start block 122, a determination is made a the decision block 124, as to whether a saved search query is to be reused. Such a determination is made, for instance, responsive to user selection of menu selections 88 and 92 of the screen display 86 shown in FIG. 2. If a saved search query is not to be used, the no branch is taken from the decision block 124 to the block 126 at which a search query is entered by the user. Then, and as indicated by block 128, the entered search query is stored at a temporary buffer, such as the buffer 56 shown in FIG. 1.

If, conversely, a determination is made at the decision block 124 that a previously-stored search query is to be retrieved, the yes branch is taken from the decision block to the block 132 where a selection is made as to which of a plurality of stored search queries is to be retrieved. Branches taken from the blocks 128 and 132 extend to the block 134 whereat the search query, either entered by the user or retrieved from the search query memory, is sent to a web browser server, such as the server 42 shown in FIG. 1. Then, and as indicated by the block 136, the search results are detected and displayed upon a user display at the mobile station.

Then, and as indicated by the decision block 138, a determination is made as to whether the search query has been saved. If not, the no branch is taken to the decision block 142 whereat an additional determination is made whether the user wants to save the entered search query. If so, the yes branch is taken to the block 144, and the search query is saved. If, conversely, a determination is made at the decision block 138 that the search query has already been saved, such as retrieval of a previously-stored search query, the yes branch is taken to the stop block 146. And, if a determination is made at the block 142 that the user does not want to save the search query, the no branch is taken therefrom, here to the block 145. At the block 145, the search query is saved at a FIFO (first-in, first-out) buffer at which the most recent, here the X most recent, search queries are stored, even without request by the user. The FIFO buffer, in the exemplary implementation, is formed at the memory 62, and the contents thereof are retrievable in like manner as that described previously. In another implementation, a path extends directly from the decision block 142 to the stop block 146.

Thereby, through operation of an embodiment of the present invention, improved convenience of operation of a mobile station to perform net-searching operations is provided. By storing previously-entered search queries in a search query memory, when the same search query is to be used, the user of the mobile station need not reenter the entire query.

The previous descriptions are of preferred examples for implementing the invention, and the scope of the invention should not necessarily be limited by this description. The scope of the present invention is defined by the following claims:

We claim:

1. In a mobile station operable in a radio communication system at least to generate search patterns pursuant to net-searching operation, each search pattern formed of a data sequence, an improvement of user-interface apparatus for facilitation the net searching operations initiated by a user of the mobile station, said user-interface apparatus comprising:
   a storage element selectably operable to store at least a first search pattern entered by the user pursuant to a first net-searching operation;
   a retriever coupled to said storage element to receive a request by the user to retrieve a selected search pattern of the at least the first search pattern, said retriever for retrieving the selected search pattern from said storage element responsive to the request therefor, the selected search pattern, once retrieved, selectable by the user for use pursuant to a subsequent net-searching operation; and
   a mobile-station user actuator coupled to said storage element, said user actuator operable by the user to request retrieval of a previously-stored search pattern.

2. The user-interface apparatus of claim 1, wherein said mobile-station user actuator is further operable by the user to enter the at least the first search pattern pursuant to the first net-searching operation.

3. In a mobile station operable in a radio communication system at least to generate search patterns pursuant to net-searching operation, each search pattern formed of a data sequence, an improvement of user-interface apparatus for facilitation the net searching operations initiated by a user of the mobile station, said user-interface apparatus comprising:
   a storage element selectably operable to store at least a first search pattern entered by the user pursuant to a first net-searching operation;
   a retriever coupled to said storage element to receive a request by the user to retrieve a selected search pattern of the at least the first search pattern, said retriever for retrieving the selected search pattern from said storage element responsive to the request therefor, the selected search pattern, once retrieved, useable pursuant to a subsequent net-searching operation; and
   a user actuator coupled to said storage element, said user actuator selectably actuable by the user to enter the at least the first search pattern, wherein additional selected actuation of said user actuator initiates generation of a search request at the mobile station, the search request defined by the at least the first search pattern; and
   wherein said user actuator is further selectably actuable to select storage of the at least the first search pattern at said storage element, actuation of said user actuator to select the storage of the at least the first search pattern made prior to initiation of the generation of the search request at the mobile station.

4. The user-interface apparatus of claim 2 wherein said mobile-station user actuator is further operable by the user to select storage of the at least the first search pattern at said storage element.

5. The user-interface apparatus of claim 3 wherein the storage element is of a storage capacity permitting storage thereat of a plurality of search patterns.

6. The user-interface apparatus of claim 3 wherein said user actuator is further coupled to said retriever and wherein the request to which said retriever is coupled to receive is generated by selected user action of said user actuator.

7. The user-interface apparatus of claim 3 wherein the radio communication system comprises radio network infrastructure and a web browser search engine coupled thereto, wherein the net-searching operation comprises a web browser search, and wherein additional selected actuation of said user actuator initiates generation of a search request at the mobile station, the search request defined by the at least the first search pattern.

8. In a mobile station operable in a radio communication system at least to generate search patterns pursuant to net-searching operation, each search pattern formed of a data sequence, an improvement of user-interface apparatus for facilitation the net searching operations initiated by a user of the mobile station, said user-interface apparatus comprising:
   a storage element selectably operable to store at least a first search pattern entered by the user pursuant to a first net-searching operation;
   a retriever coupled to said storage element to receive a request by the user to retrieve a selected search pattern of the at least the first search pattern, said retriever for retrieving the selected search pattern from said storage element responsive to the request therefor, the selected search pattern, once retrieved, useable pursuant to a subsequent net-searching operation; and
   a user actuator coupled to said storage element, said user actuator selectably actuable by the user to enter the at least the first search pattern, wherein additional selected actuation of said user actuator initiates generation of a search request at the mobile station, the search request defined by the at least the first search pattern; and
   wherein said user actuator is further selectably actuable to select storage of the at least the first search pattern at said storage element, actuation of said user actuator to select the storage of the at least the first search pattern made subsequent to initiation of the generation of the search request at the mobile station.

9. The user-interface apparatus of claim 8, wherein the radio communication system comprises radio network infrastructure and a web browser search engine coupled thereto, wherein the net-searching operation comprises a web browser search, and wherein the web browser search engine performs a search responsive to the search request and generates search results, the search results returned to the mobile station, and wherein the actuation of said user actuator to select the storage of the at least the first search result is made subsequent to receipt at the mobile station of the search results.

10. The user-interface apparatus of claim 8 wherein the web browser search engine performs a search responsive to the search results returned to the mobile station, and wherein said apparatus further comprises a user display, said user display for displaying the search results returned by the web browser search engine.

11. The user-interface apparatus of claim 8 further comprising a user display for displaying the search pattern entered by the user pursuant to the first net-searching operation.

12. The user-interface apparatus of claim 8 further comprising a user display coupled to said storage element, said user display for displaying indicia of the at least the first search pattern stored at said storage element.

13. The user-interface apparatus of claim 12 wherein a plurality of search patterns are stored at said storage element and wherein indicia of each of the plurality of search patterns are displayable upon said user display.

14. The user-interface apparatus of claim 13 wherein the request to which said retriever is coupled to receive is made by the user subsequent to display of the indicia of each of the plurality of search patterns.

15. A method for facilitating net-searching operations initiated by a user of the mobile station communicating in a radio communication system, the mobile station operable to generate search patterns pursuant to the net-searching operations, each search pattern formed of a data sequence, said method comprising:

selectably storing at least one search pattern entered by the user pursuant to a first net-searching operation;

receiving, subsequent to the storing step, a mobile-station user request to retrieve a previously-stored search pattern; and selectably retrieving, in response to the user request, a selected search pattern of the at least the first search pattern stored during said operation of selectably storing, wherein said selected search pattern is usable to initiate a search in response to a user request subsequent to said operation of selectable retreiving.

16. The method of claim 15, wherein the at least one search pattern comprises a plurality of search patterns, said method further comprising the step of receiving a user selection of one of the plurality of search patterns.

* * * * *